(12) United States Patent
Kammer (10) Patent No.: US 7,356,347 B1
(45) Date of Patent: Apr. 8, 2008

(54) EFFICIENT DISCOVERY OF DEVICES IN A BLUETOOTH ENVIRONMENT

(75) Inventor: David Kammer, Seattle, WA (US)

(73) Assignee: PalmSource, Inc., Sunnyvale, CA (US)

( * ) Notice: Subject to any disclaimer, the term of this patent is extended or adjusted under 35 U.S.C. 154(b) by 545 days.

(21) Appl. No.: 09/676,270

(22) Filed: Sep. 28, 2000

(51) Int. Cl.
*H04Q 7/20* (2006.01)

(52) U.S. Cl. ............... 455/517; 455/515; 455/516; 455/41.2; 711/113; 711/202; 711/220; 340/10.1; 340/10.42

(58) Field of Classification Search ............ 455/41.2, 455/517, 515, 516; 711/113–146, 202, 203, 711/206, 220; 340/10.01, 10.42, 10.1, 19.42
See application file for complete search history.

(56) References Cited

U.S. PATENT DOCUMENTS

| | | | |
|---|---|---|---|
| 5,293,644 A * | 3/1994 | Barry et al. ............... | 340/7.46 |
| 5,448,764 A * | 9/1995 | Sondermann et al. ......... | 455/88 |
| 5,555,426 A | 9/1996 | Johnson et al. | |
| 5,592,154 A * | 1/1997 | Lin et al. ................. | 455/435.3 |
| 5,598,536 A * | 1/1997 | Slaughter et al. ........... | 709/219 |
| 5,668,952 A * | 9/1997 | Slane ....................... | 709/245 |
| 5,835,720 A * | 11/1998 | Nelson et al. .............. | 709/224 |
| 5,854,901 A * | 12/1998 | Cole et al. ................. | 709/245 |
| 5,898,690 A | 4/1999 | Masashi | |
| 6,026,445 A * | 2/2000 | Kephart et al. ............ | 709/245 |
| 6,249,814 B1 * | 6/2001 | Shaffer et al. ............. | 709/223 |
| 6,442,144 B1 * | 8/2002 | Hansen et al. ............. | 370/255 |
| 6,681,108 B1 * | 1/2004 | Terry et al. ............. | 455/412.2 |

FOREIGN PATENT DOCUMENTS

| EP | 1 322 071 A2 * | 6/2003 |
|---|---|---|
| WO | WO 97/38542 | 10/1997 |

OTHER PUBLICATIONS

"Specification of the Bluetooth System, Wireless connections made easy, vol. 1, version 1.0 B, v1.0.b, Profiles, Generic Access Profile, Chapter 6 Idle Mode Procedures, pp. 27 to 44, 227" Bluetooth Specification, Online! Dec. 1, 1999, pp. 37-44, XPP002213903; Retrieved from the Internet; <URL.www.bluetooth.org>, 'retrieved on Sep. 18, 2002! p. 40, paragraph .3.6-p. 42, paragraph 6.4.4 p. 227; figures 2.2, 2.,3.

* cited by examiner

*Primary Examiner*—Nghi H. Ly
(74) *Attorney, Agent, or Firm*—Berry & Associates P.C.

(57) ABSTRACT

A method and system whereby an initiator device discovers the user-friendly name of another device in a wireless network of devices, such as a Bluetooth network. Initially, the initiator device broadcasts an inquiry message that is received by the other device (the responding device). The responding device provides its address in response to the inquiry. The initiator device then transmits a page, followed by a name request, to the responding device. The responding device provides its user-friendly name in response to the name request. The initiator device stores (e.g., caches) the address and the associated user-friendly name in a memory cache. When the initiator device subsequently sends an inquiry message that is received by the responding device, the responding device will provide its address to the initiator device. However, instead of sending a name request, the initiator device can retrieve the user-friendly name from the memory cache based on the address. Thus, the number of messages needed for the name discovery process is reduced, allowing the process to be performed more quickly and conserving the battery resources of the initiator and responding devices. In addition, potential errors associated with the name requests can be reduced or eliminated.

24 Claims, 9 Drawing Sheets

| ADDRESS INFORMATION 750 | USER-FRIENDLY NAME 760 |
|---|---|
| nnn.nnnnn.nn | "Color Printer - 2nd Floor" |
| mmm.mmmmm.mm | "Black & White Printer - 2nd Floor" |

EFFICIENT DISCOVERY OF DEVICES IN A BLUETOOTH ENVIRONMENT

TECHNICAL FIELD

The present invention relates to networks of devices that can be connected using wireless links, in particular devices that use the Bluetooth technology. Specifically, the present invention pertains to a method and system used by one Bluetooth device to discover the user-friendly name of another Bluetooth device.

BACKGROUND ART

Computer systems and other types of consumer electronic devices are commonly linked to each other and to peripheral devices using a myriad of different types of cables and connectors. As these devices grow in number and variety, their cables and connectors can often become quite cumbersome to work with. Accordingly, efforts are underway to develop technologies allowing hardware connections to be replaced with wireless ones.

One such technology is the Bluetooth technology. Bluetooth is the code name for a technology specification for short-range radio links that will allow the many proprietary cables that connect devices to one another to be replaced with short-range radio links.

The Bluetooth technology is based on a high-performance, yet low-cost, integrated radio transceiver. For instance, Bluetooth transceivers built into both a cellular telephone and a laptop computer system would replace the cables used today to connect a laptop to a cellular telephone. Printers, personal digital assistants (palmtop computer systems, hand-held devices and the like), desktop computer systems, fax machines, keyboards, joysticks and virtually any other digital device can be part of a Bluetooth system. Bluetooth radio technology can also provide a universal bridge to existing data networks and a mechanism to form small private ad hoc groupings ("scatternets" or "piconets") of connected devices away from fixed network infrastructures.

The Bluetooth technology allows Bluetooth devices to "discover" other Bluetooth devices that are within range and then connect with those devices, either automatically or at a user's discretion. The Generic Access Profile (GAP) of the Bluetooth specification (Section 6 of "Specification of the Bluetooth System, Core," version 1.0B, dated Dec. 1, 1999, herein incorporated by reference as background) describes the processes by which Bluetooth devices discover each other. The device discovery process has two primary steps: an inquiry step (described in Sections 6.1 and 6.2 of the Bluetooth specification), and a name discovery step (described in Section 6.3 of the Bluetooth specification). In the inquiry step, the Bluetooth devices make their presence known to each other and exchange attributes (e.g., addresses) needed to further the connection process. In the name discovery step, user-friendly names are exchanged to help a user identify Bluetooth devices that are in the environment. The inquiry and discovery steps are described in further detail below.

Figure 1:
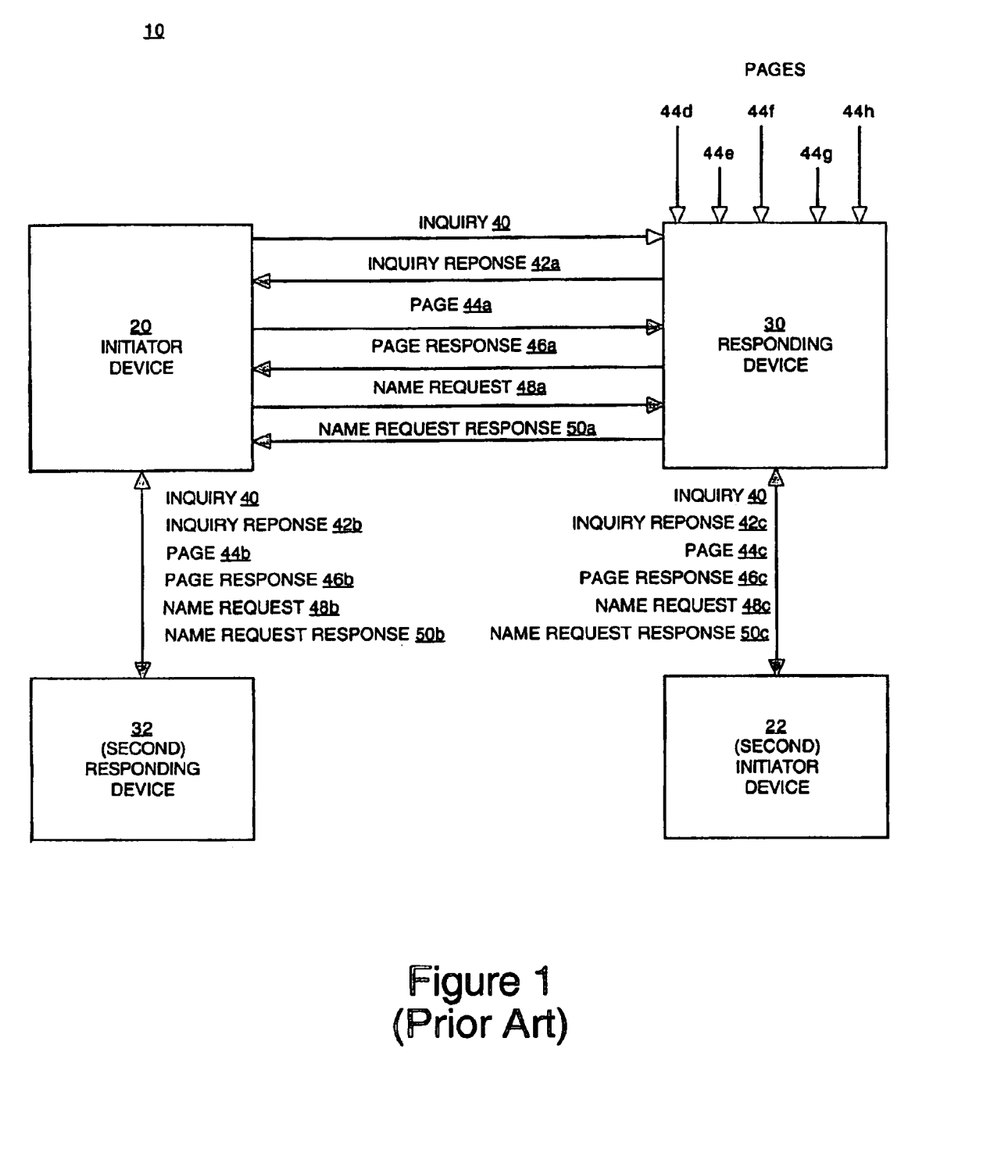
FIG. 1 is a data flow diagram illustrating a prior art process initiated by one device to discover the name of another device.

Prior Art FIG. 1 is a data flow diagram 10 illustrating the GAP process used by one Bluetooth device (initiator device 20) to discover the name of another Bluetooth device (e.g., responding device 30). First, initiator device 20 sends (broadcasts) an inquiry 40 over the nominal range of a typical Bluetooth device (e.g., approximately 10 meters). When initiator device 20 initiates an inquiry 40, it typically remains in the inquiry state for 10.24 seconds (this time is programmable, but the Bluetooth specification recommends 10.24 seconds).

In order to receive and respond to inquiry 40, responding devices 30 and 32 must be "discoverable" (e.g., the devices must be scanning for inquiry messages). Responding devices 30 and 32 send inquiry responses 42a and 42b, respectively, to initiator device 20 in response to inquiry 40. Inquiry responses 42a and 42b provide the Bluetooth device addresses (a numerical address or a device access code) for responding devices 30 and 32, and optionally provide additional information such as the clock, class of device and page scan mode. Significantly, inquiry responses 42a and 42b do not provide a name (or user-friendly name) for responding devices 30 and 32. The user-friendly name can be up to 248 characters long and is not provided in order to reduce the length of the inquiry responses.

Initiator device 20 can therefore receive an inquiry response from multiple Bluetooth devices (e.g., responding devices 30 and 32), providing each devices' numerical address at least. Generally, a user will not be able to identify one type of responding device over another based only on the device's numerical address. For example, there may be two printers in proximity, and the user generally will not be able to tell which printer to connect with based on the numerical address. However, "user-friendly names" can be used to identify each printer's location and features, allowing the user to make a selection of one over the other. Therefore, initiator device 20 needs to discover and display the user-friendly name for each of the devices that responded, so that the user can select the appropriate device with which to connect.

To accomplish this, initiator device 20 must connect one device at a time to each of the responding devices 30 and 32 in order to request a user-friendly name. Accordingly, initiator device 20 sends pages 44a and 44b to each device that responded to inquiry 40. In response to the pages 44a and 44b, responding devices 30 and 32 send page responses 46a and 46b, respectively.

Next, initiator device 20 will send name requests 48a and 48b to responding devices 30 and 32, respectively. In response to name request 48a, responding device 30 sends name request response 50a to initiator device 20. Similarly, in response to name request 48b, responding device 32 sends name request response 50b to initiator device 20. Name request responses 50a and 50b provide the user-friendly names for responding devices 30 and 32, respectively. The user-friendly names are displayed to the user, who can then select one or more of the responding devices with which to connect.

There are a number of disadvantages associated with the Bluetooth name discovery process described above. One disadvantage is that the process, with up to six messages being exchanged between pair of initiator and responding devices, can take a relatively long time to complete.

Another disadvantage is that sending and responding to multiple pages 44a, 44b and 44c and multiple name requests 48a, 48b and 48c can consume the limited power resources that are typically available to initiator device 20 and responding device 30. For example, personal digital assistants (PDAs), cell phones, and other mobile devices are limited in size and weight, and therefore these types of devices typically use smaller and lighter batteries of limited capacity. Each page 44a and 44b consumes the limited power available for initiator device 20, and each page response 46a and 46c consumes the limited power available for responding device 30. Similarly, each name request 48a and 48b further consumes the limited power available for initiator device 20, and each name request response 50a and 50c further consumes the limited power available for responding device 30. Consequently, more frequent battery charges may be needed, inconveniencing the user.

Yet another disadvantage to the Bluetooth name discovery process is that two Bluetooth initiator devices (such as initiator device 20 and initiator device 22) may each issue a page or name request (e.g., pages 44a and 44c and/or name requests 48a and 48c) to responding device 30 at the same time. Responding device 30 can only respond to one of the initiator devices at a time, and will ignore the other; for example, responding device 30 will respond to initiator device 20 and ignore the page 44c from initiator device 22. As a result, page 44c from initiator device 22 can time out before initiator device 22 receives a response from responding device 30. Consequently, the initiator device 22 must retransmit page 44c until a page response 46c is received.

A similar situation occurs when responding device 30 moves out of range of initiator device 20 between the time at which inquiry response 42 is received by initiator device 20 and the time at which initiator device 20 sends page 44a or name request 48a. For example, responding device 30 may be a PDA, a cell phone, or other mobile device. The user carrying responding device 30 may have been within range of initiator device 20 when inquiry 40 was sent, and then moved out of range before name request 48a was sent. Under these circumstances, the name request 48a will time out, and initiator device 20 may repeatedly retransmit name request 48a until the device recognizes that responding device 30 is no longer in range.

Thus, the prior art name discovery process described by the Bluetooth specification can be unpredictable and inefficient, increasing the time needed to identify and connect with Bluetooth devices. These problems are exacerbated as Bluetooth devices grow in number and popularity. With more Bluetooth devices in use, a responding device 30 is more likely to receive numerous pages (e.g., 44a-44h) and or name requests (not shown) from multiple initiator devices within range. It is also more likely that the pages 44a-44h and/or name requests will collide, and that many of these pages and/or name requests will be ignored and have to be retransmitted. It is also more likely that, as the number of Bluetooth devices increase, pages and/or name requests will be sent to a responding device that was only temporarily in range of an initiator device. When no response is received, these pages and/or name requests will generally have to be retransmitted.

Thus, with more Bluetooth devices in use, the prior art name discovery process can become more inefficient and unpredictable, generating an increasing number of messages as repeated attempts are made to complete the process. In addition, the increase in messages—the increase in pages and name requests, the increase in retransmitted pages and name requests, and the corresponding increase in the number of responses to pages and name requests—will further increase the burden on the limited power resources of both initiator and responding Bluetooth devices.

Finding a solution to the problems described above is made more complex because the solution must be substantially compliant with the Bluetooth specification. That is, many Bluetooth devices are being designed and manufactured according to the Bluetooth specification. Consequently, a solution that relies on a significant deviation from the Bluetooth specification will create new problems, such as incompatibility between newer Bluetooth devices and legacy Bluetooth devices. An aim of the Bluetooth specification is to provide a level of standardization across all Bluetooth devices, and a substantial deviation from the specification would be contrary to that aim. Accordingly, any solution to the prior art problems described above should be satisfactorily consistent with the Bluetooth specification, or it should be a solution that can be incorporated into legacy Bluetooth devices.

DISCLOSURE OF THE INVENTION

Accordingly, a need exists for a device and/or method that can speed up the Bluetooth name discovery process, and that can eliminate or reduce the inefficiency and unpredictability that can occur because of collisions between name requests or because devices move out of range of each other. A need also exists for a device and/or method that can satisfy the above needs and that can reduce the burden on the limited power resources available to many types of Bluetooth devices. In particular, a need exists for a device and/or method that can satisfy the above needs and that is consistent with the Bluetooth specification, and that can be implemented in Bluetooth-enabled devices including legacy Bluetooth devices. The present invention provides these advantages and others not specifically mentioned above but described in the sections to follow.

A method and device are described whereby one device (an "initiator device") discovers the user-friendly name of another device (a "responding device") in a wireless network of devices. In the preferred embodiment, the devices are Bluetooth-enabled devices.

In accordance with the present invention, the initiator device stores (e.g., caches) the address (e.g., a numerical address or device access code) and the associated user-friendly name for each of a plurality of responding devices in a memory cache. In the present embodiment, the address is used as an index for the user-friendly name. When the initiator device sends an inquiry message that is received by a responding device, the responding device will provide its address to the initiator device. However, instead of sending a page and a name request, the initiator device uses the address to retrieve the user-friendly name from the memory cache. In one embodiment, the user-friendly name is displayed to a user, and the user can then decide whether to establish a persistent connection with the responding device. Therefore, in accordance with the present invention, it is not necessary to send a page and a name request when the user-friendly name can be retrieved from memory.

In the present embodiment, when a persistent connection is made between the initiator device and the responding device, the user-friendly name is supplied by the responding device to the initiator device. This information can be used to update the user-friendly name in the memory cache, in case the name has changed since a previous connection between the initiator device and the responding device.

In another embodiment, an aging scheme is applied when the number of entries (e.g., names and addresses) in the memory cache reaches a maximum amount. In this case, a more recent (newest) entry in the memory cache will replace an entry that is, for example, the oldest or the least frequently accessed.

Thus, in accordance with the present embodiment of the present invention, there are instances in which the page and the name request messages can be eliminated from the name discovery process used by Bluetooth devices. Consequently, the number of messages needed for the name discovery process can be reduced, speeding up the process and conserving the power resources of the initiator and responding devices.

In addition, potential errors associated with the pages and name requests can be reduced or eliminated, increasing the efficiency and predictability of the name discovery process. For example, in accordance with the present invention, the number of initiator devices sending pages and/or name requests at any given time will be reduced. Consequently, the number of instances in which a responding device will ignore one initiator device because it is responding to another will also be reduced, and therefore pages and name requests will not time out as often because they are being ignored. In addition, should the responding device move out of range of the initiator device in the time between the inquiry message and the page and/or name request, the initiator device can still complete the name discovery process by retrieving the user-friendly name from cache memory.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "storing," "retrieving," "updating," "removing," "displaying," "transmitting," "accessing," or the like, refer to the action and processes (e.g., process 800 of FIG. 8) of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

The present invention is discussed primarily in a context in which devices and systems are coupled using wireless links, and specifically with regard to devices and systems compliant with the Bluetooth technology. Bluetooth is the code name for a technology specification for small form factor, low-cost, short-range radio links between personal computers (PCs), mobile phones and other devices. The Bluetooth technology allows cables that connect devices to one another to be replaced with short-range radio links. However, it is appreciated that the present invention may be utilized with devices and systems coupled using technologies and/or protocols different from Bluetooth, including but not limited to infrared communications links as defined by the Infrared Data Association (IrDA).

In the parlance of Bluetooth, a collection of devices connected in a Bluetooth system is referred to as a "piconet" or a "subnet." A piconet starts with two connected devices, such as a computer system and a cellular phone, and may grow to eight connected devices. All Bluetooth devices are peer units; however, when establishing a piconet, one unit will act as a master and the other(s) as slave(s) for the duration of the piconet connection.

A Bluetooth system supports both point-to-point and point-to-multi-point connections. Several piconets can be established and linked together in a "scatternet," where each piconet is identified by a different frequency hopping sequence. All devices participating on the same piconet are synchronized to their respective hopping sequence.

Figure 2:
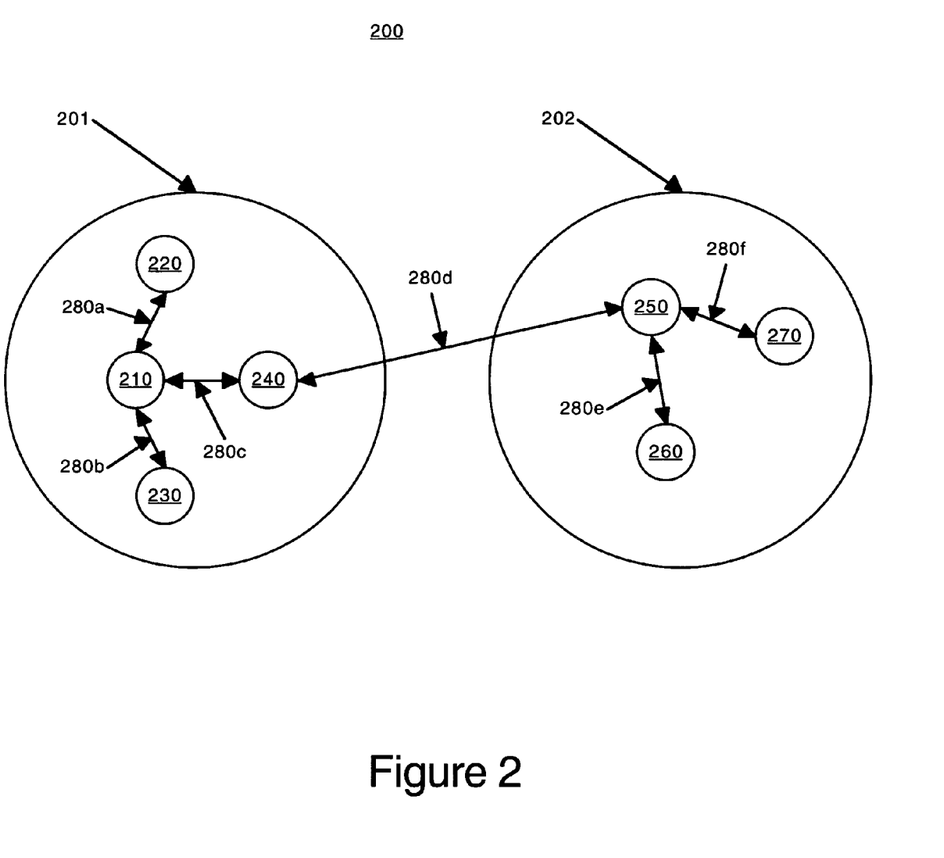
FIG. 2 illustrates a network of devices coupled using wireless connections in accordance with one embodiment of the present invention.

FIG. 2 illustrates the topology of a network 200 of devices coupled using wireless connections in accordance with one embodiment of the present invention. Devices 210, 220, 230 and 240 are coupled in piconet 201 using wireless connections 280a-c. Similarly, devices 250, 260 and 270 are coupled in piconet 202 using wireless connections 280e-f. Piconet 201 and piconet 202 are coupled using wireless connection 280d. Devices 210-270 can be printers, personal digital assistants (PDAs), desktop computer systems, laptop computer systems, cell phones, fax machines, keyboards, joysticks and virtually any other device. In the present embodiment, devices 210-270 are Bluetooth devices; that is, they are equipped with a Bluetooth radio transceiver, or they are adapted to communicate with Bluetooth devices ("Bluetooth-enabled"). That is, the Bluetooth radio transceiver may be integrated into a device, or it may be coupled to a device.

Figure 3:
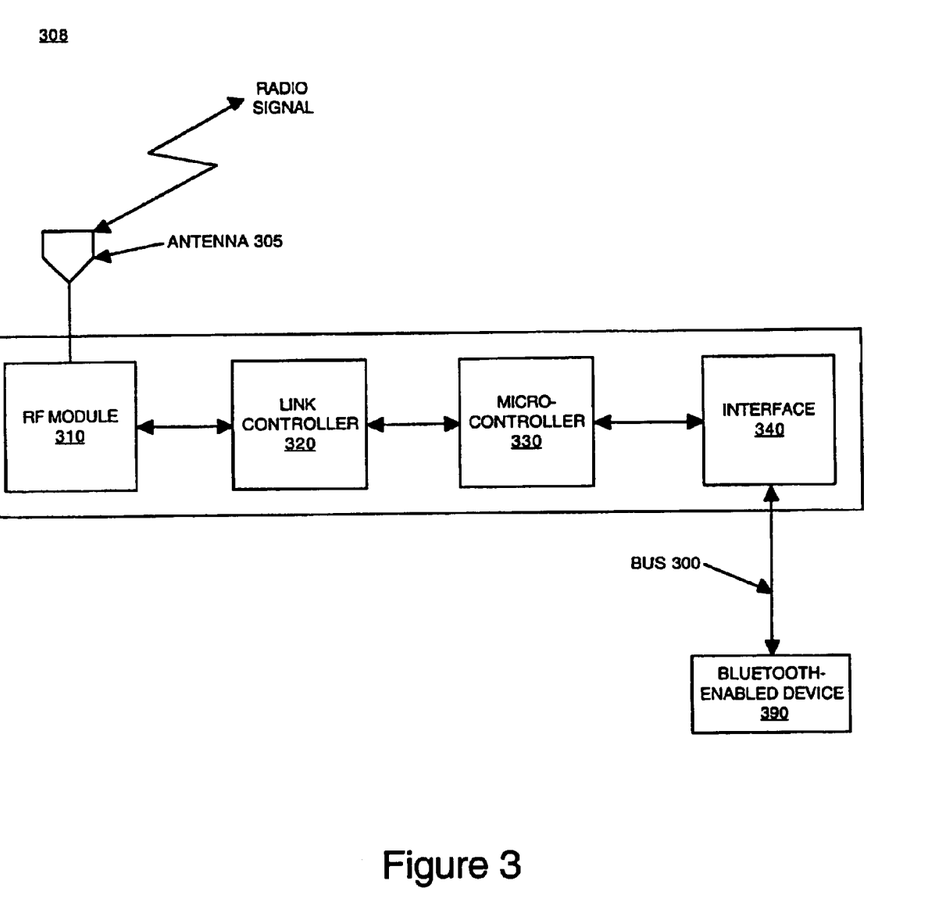
FIG. 3 is a block diagram showing one embodiment of a Bluetooth wireless transceiver in accordance with the present invention.

FIG. 3 is a block diagram of one embodiment of a transceiver 308 in accordance with the present invention. In a preferred embodiment (the "Bluetooth embodiment"), transceiver 308 is a Bluetooth device comprising a digital component (e.g., a Bluetooth controller) and an analog component (e.g., a Bluetooth radio).

In the present embodiment, transceiver 308 comprises an antenna 305 for receiving or transmitting radio signals, a radio frequency (RF) module 310, a link controller 320, a microcontroller (or central processing unit) 330, and an external interface 340. In the present embodiment, transceiver 308 is coupled by a system bus 300 to a Bluetooth-enabled device 390 (e.g., a host device such as a computer system or similar intelligent electronic device, a PDA, a printer, a fax machine, etc.). However, it is appreciated that in another embodiment, transceiver 308 may be integrated into Bluetooth-enabled device 390.

In the Bluetooth embodiment, RF module 310 is a Bluetooth radio. The Bluetooth radio can provide: a bridge to existing data networks, a peripheral interface, and a mechanism to form piconets of connected devices away from fixed network infrastructures (see FIG. 2).

Bluetooth radios operate in the ISM (Industrial, Scientific, Medical) band at 2.4 GHz. A frequency hop transceiver is applied to combat interference and fading. Bluetooth uses a packet-switching protocol based on a frequency hop scheme with 1600 hops/second. Slots can be reserved for synchronous packets. A packet nominally covers a single slot, but can be extended to cover up to five slots. Each packet is transmitted in a different hop frequency. The entire available frequency spectrum is used with 79 hops of one (1) MHz bandwidth, defined analogous to the IEEE (Institute of Electronic and Electrical Engineering) 802.11 standard. The frequency hopping scheme is combined with fast ARQ (Automatic Repeat Request), cyclic redundancy check (CRC) and Forward Error Correction (FEC) for data.

In the present embodiment, link controller 320 is a hardware digital signal processor for performing baseband processing as well as other functions such as Quality-of-Service, asynchronous transfers, synchronous transfers, audio coding, and encryption (refer also to FIG. 6, below). Link controller 320 has two major states: standby and connection. In addition, there are seven substates: page, page scan, inquiry, inquiry scan, master response, slave response, and inquiry response. The substates are interim states that are used to add new slaves to a piconet (FIG. 2).

Continuing with reference to FIG. 3, in one embodiment, microcontroller 330 is an application specific integrated circuit (ASIC). In the Bluetooth embodiment, microcontroller 330 is a separate central processing unit (CPU) core for managing transceiver 308 and for handling some inquiries and requests without having to involve the host device. In the Bluetooth embodiment, microcontroller 330 runs software that discovers and communicates with other Bluetooth devices via the Link Manager Protocol (LMP). The LMP provides a number of services including sending and receiving of data, inquiring of and reporting a name or device identifier, making and responding to link address inquiries, connection setup, authentication, and link mode negotiation and setup. The LMP also can be used to place transceiver 308 in "sniff" mode, "hold" mode, "park" mode or "standby" mode. Refer also to FIG. 6, below.

The hold mode is a power saving mode that can be used for connected units if no data need to be transmitted. The sniff and park modes are also low power modes. In the sniff mode, a device listens to the piconet at a reduced rate (relative to the regular rate), thus reducing its duty cycle. The sniff interval is programmable and depends on the application. In the park mode, a device is still synchronized to the piconet but does not participate in the traffic.

In the present embodiment, before any connections between Bluetooth devices are created, all devices are in standby mode; that is, the standby mode is the default mode of a Bluetooth device. The standby mode is a low power mode in which an unconnected unit "listens" for messages at a regular rate (generally, every 2.56 seconds according to the Bluetooth specification) on a set of hop frequencies defined for that unit. Link controller 320 may leave the standby mode to scan for page or inquiry messages, or to transmit a page or inquiry message. When responding to a page message, the Bluetooth device enters the connection state as a slave. When carrying out a successful page attempt, the Bluetooth device enters the connection state as a master.

Figure 7A:
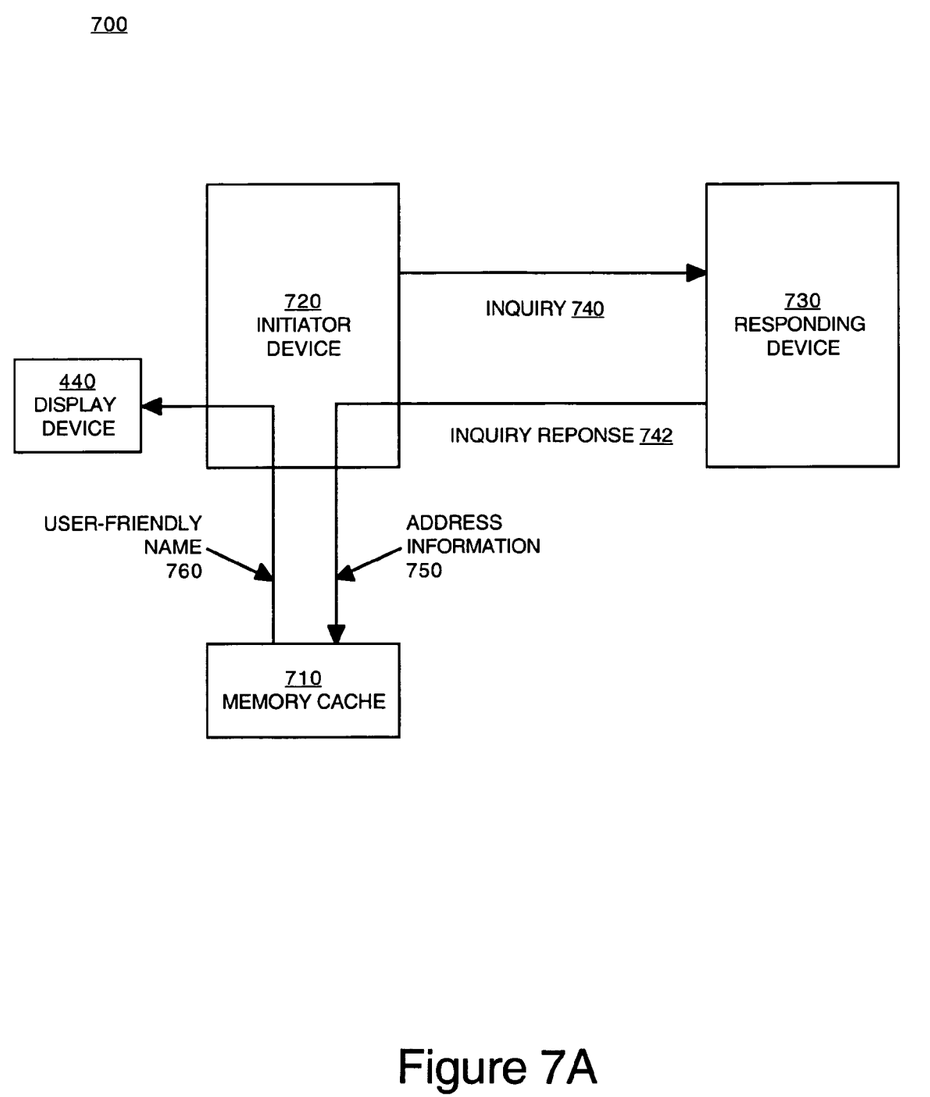
FIG. 7A is a data flow diagram illustrating a process for discovering the name of a device in accordance with one embodiment of the present invention.

A "discoverable device" is a Bluetooth device in range that will respond to an inquiry (normally in addition to responding to a page). A "connectable device" is a Bluetooth device in range that will respond to a page. Additional information is provided in conjunction with FIG. 7.

With reference still to FIG. 3, in the present embodiment, interface 340 is for coupling transceiver 308 to Bluetooth-enabled device 390 in a suitable format. Transceiver 308 may be coupled by system bus 300 to Bluetooth-enabled device 390 (e.g., a host device such as a computer system or similar intelligent electronic device, a PDA, a printer, a fax machine, etc.), or transceiver 308 may be integrated into Bluetooth-enabled device 390. In the present embodiment, interface 340 runs software that allows transceiver 308 to interface with the operating system of Bluetooth-enabled device 390. In accordance with the present invention, interface 340 may be any of a variety of physical bus interfaces, including but not limited to a Universal Serial Bus (USB) interface, a Personal Computer (PC) Card interface, a CardBus or Peripheral Component Interconnect (PCI) interface, a mini-PCI interface, a Personal Computer Memory Card International Association (PCMCIA) interface, an Industry Standard Architecture (ISA) interface, or a RS-232 interface.

Figure 4:
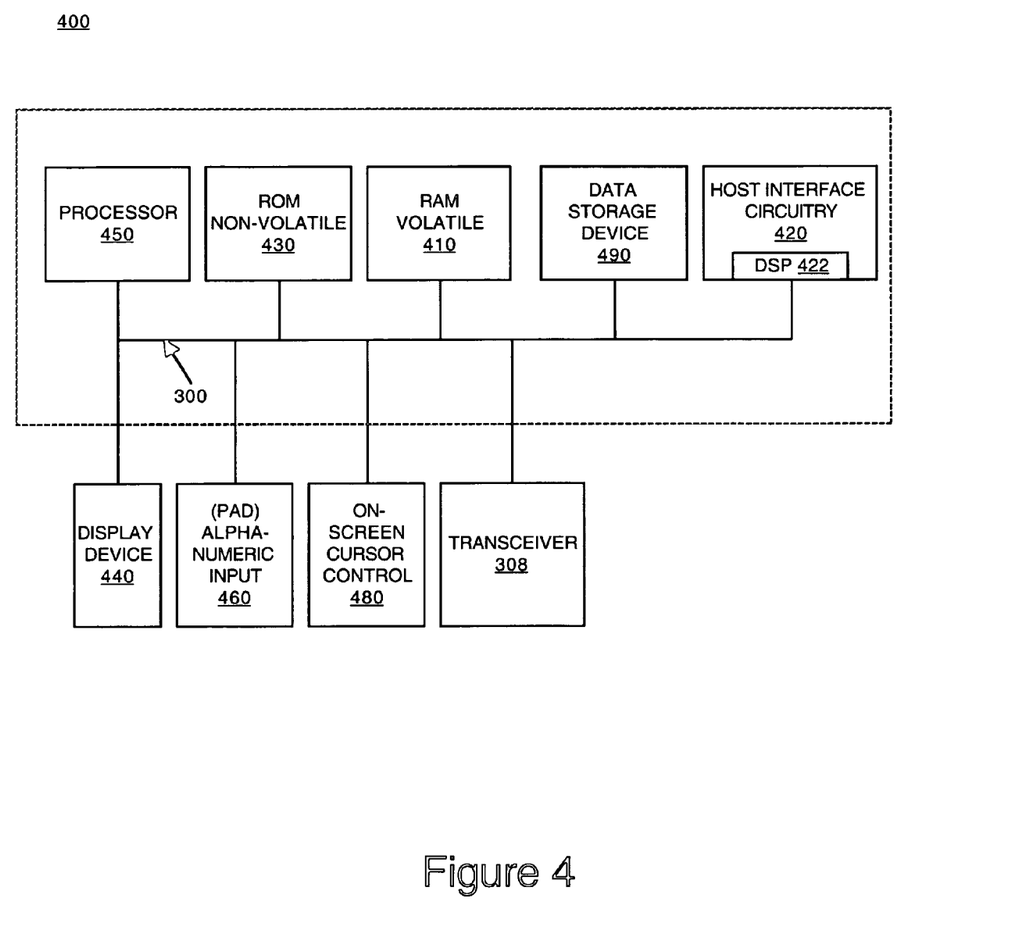
FIG. 4 is a block diagram of an exemplary portable computer system coupled to the Bluetooth wireless transceiver of FIG. 3 in accordance with one embodiment of the present invention.

FIG. 4 is a block diagram of one embodiment of a host device that can be used in accordance with the present invention. In the present embodiment, the host device is a portable computer system 400; however, it is appreciated that the host device may be another type of intelligent electronic device. In the Bluetooth embodiment, portable computer system 400 is a Bluetooth-enabled device (e.g., device 390 of FIG. 3) coupled with a Bluetooth transceiver 308. Portable computer system 400 is also referred to as a PDA, a portable information device (PID), a palmtop or hand-held computer system.

Continuing with reference to FIG. 4, portable computer system 400 includes an address/data bus 300 for communicating information, a central processor 450 coupled with the bus 300 for processing information and instructions, a volatile memory 410 (e.g., random access memory, RAM) coupled with the bus 300 for storing information and instructions for the central processor 450, and a non-volatile memory 430 (e.g., read only memory, ROM) coupled with the bus 300 for storing static information and instructions for the processor 450. Portable computer system 400 also includes an optional data storage device 490 (e.g., a memory stick) coupled with the bus 300 for storing information and instructions. Device 490 can be removable. Portable computer system 400 also contains a display device 440 coupled to the bus 300 for displaying information to the computer user.

Portable computer system 400 also includes a signal transmitter/receiver (transceiver) device 308, which is coupled to bus 300 for providing a wireless radio (RF) communication link between computer system 400 and other wireless devices. In the Bluetooth embodiment, transceiver 308 is compliant with the Bluetooth specification; see FIG. 3.

In one embodiment, portable computer system 400 of FIG. 4 includes host interface circuitry 420 coupled to bus 300. Host interface circuitry 420 includes an optional digital signal processor (DSP) 422 for processing data to be transmitted or data that are received via transceiver 308. Alternatively, processor 450 can perform some or all of the functions performed by DSP 422.

Also included in computer system 400 is an optional alphanumeric input device 460 that, in one implementation, is a handwriting recognition pad ("digitizer"). Alphanumeric input device 460 can communicate information and command selections to processor 450 via bus 300. In one implementation, alphanumeric input device 460 is a touch screen device. Alphanumeric input device 460 is capable of registering a position where a stylus element (not shown) makes contact.

Portable computer system 400 also includes an optional cursor control or directing device (on-screen cursor control 480) coupled to bus 300 for communicating user input information and command selections to processor 450. In one implementation, on-screen cursor control device 480 is a touch screen device incorporated with display device 440. On-screen cursor control device 480 is capable of registering a position on display device 440 where a stylus element makes contact. The display device 440 utilized with portable computer system 400 may be a liquid crystal display (LCD) device, a cathode ray tube (CRT), a field emission display device (also called a flat panel CRT), or other display device suitable for generating graphic images and alphanumeric characters recognizable to the user. In the preferred embodiment, display device 440 is a flat panel display.

Figure 5:
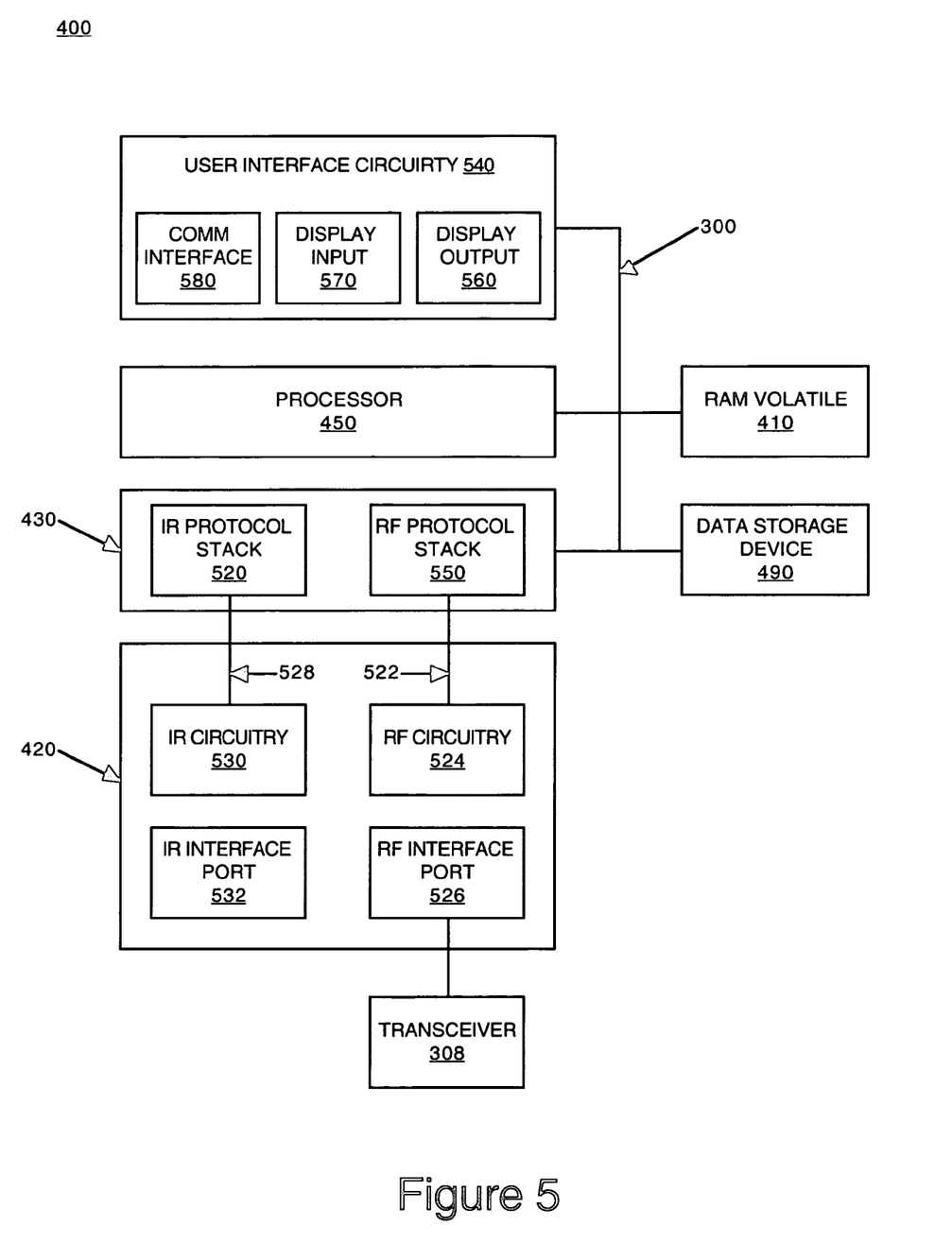
FIG. 5 is a block diagram showing features of the portable computer system of FIG. 4 in accordance with one embodiment of the present invention.

FIG. 5 is a block diagram showing additional features of portable computer system 400 in accordance with one embodiment of the present invention. User interface circuitry 540 is coupled to processor 450 via bus 300. User interface circuitry includes hardware and software components that provide user input and output resources for functions performed by processor 450. In the present embodiment, user interface circuitry 540 includes a display output 560, a display input 570, and communication interface 580.

In this embodiment, display output 560 receives digital information representing graphical information from processor 450, and converts the information to a graphical display, such as text and/or images, for display on display device 440 (FIG. 4), for example. Display input 570 may receive data inputs, such as graphical data inputs, from a user. The graphical data inputs can be entered by the user with a stylus element on the pressure-sensitive display device 440 (specifically, on-screen cursor control device 480, FIG. 4) or the alphanumeric input device 460 (FIG. 4).

The communication interface 580 allows the user to enter other types of data, such as audio or video data, or data formatted for operation with particular applications executed by portable computer system 400, such as calendar data, electronic mail data, word processing, databases, and the like. In one embodiment of the present invention, the communication interface 580 is a serial communication port, but could also alternatively be of any of a number of well-known communication standards and protocols, e.g., parallel, SCSI (small computer system interface), Firewire (IEEE 1394), Ethernet, etc.

Host interface circuitry 420 is coupled to processor 450 via bus 300. Host interface circuitry 420 (or link interface circuitry or data interface circuitry) illustrates, but is not limited to, two alternative link interface ports for establishing a wireless link to another device: an RF interface port 526 and an infrared (IR) interface port 532.

In the present embodiment, RF circuitry 524 converts signals to radio frequency output and accepts radio frequency input via RF interface port 526. In the Bluetooth embodiment, RF interface port 526 is a Bluetooth transceiver 308 (FIG. 3). RF signals received by RF circuitry 524 are converted to electrical signals and relayed to RF protocol stack 550 via connection 522.

In the present embodiment, IR circuitry 530 converts signals into infrared output and accepts infrared input via IR interface port 532. Infrared communication signals received by IR circuitry 530 are converted to electrical signals that are relayed to IR protocol stack 520 via connection 528.

Processor 450 is capable of executing RF protocol stack 550 and IR protocol stack 520. IR stack 520 implements an IR protocol to support infrared links with other devices.

Figure 6:
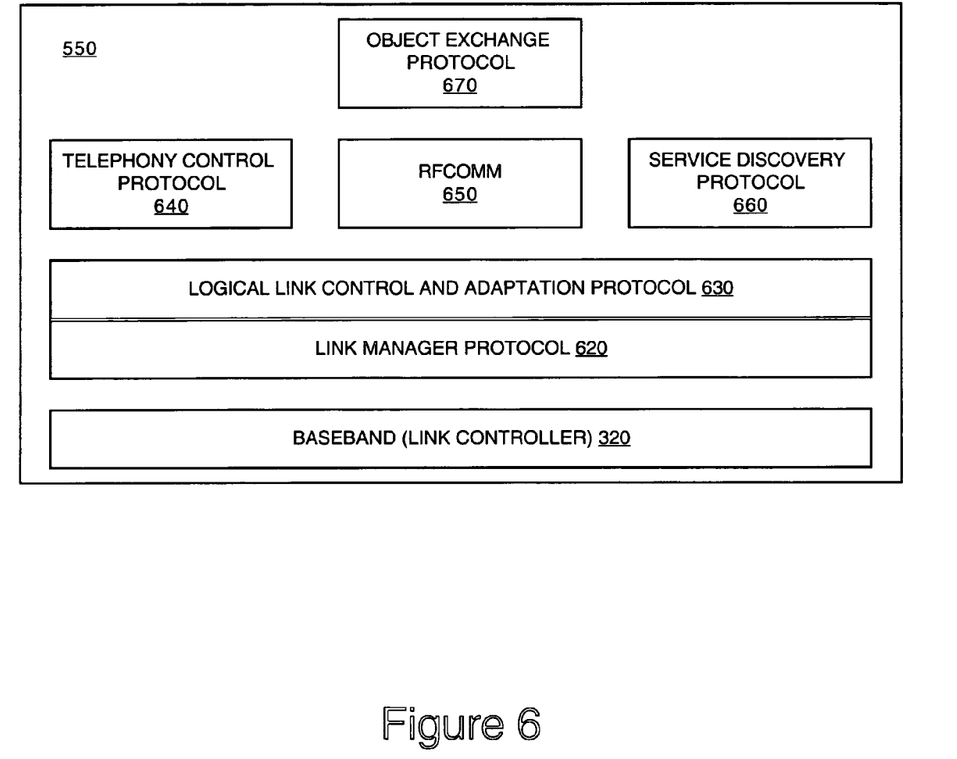
FIG. 6 is a block diagram illustrating a protocol stack used by a Bluetooth-enabled device in accordance with one embodiment of the present invention.

FIG. 6 is a block diagram illustrating the layers of the RF protocol stack 550 used by a Bluetooth-enabled device such as portable computer system 400 of FIG. 4 in accordance with one embodiment (the Bluetooth embodiment) of the present invention. The layers of RF protocol stack 550 include baseband (link controller) layer 320, Link Manager Protocol (LMP) layer 620, Logical Link Control and Adaptation Protocol (L2CAP) layer 630, Telephony Control Protocol (TCS) layer 640, RFCOMM layer 650, Service Discovery Protocol (SDP) layer 660, and Object Exchange Protocol (OBEX) layer 670.

Continuing with reference to FIG. 6, in the present embodiment, baseband layer 320 carries out baseband protocols and other low-level link routines. LMP layer 620 is used for link set-up, security and control. L2CAP layer 630 supports higher level protocol multiplexing, packet segmentation and reassembly, and the conveying of quality-of-service information. TCS layer 640 defines the call control signaling for the establishment of speech and data calls between Bluetooth devices. RFCOMM layer 650 provides emulation of serial ports over the L2CAP protocol 630. SDP layer 660 provides a means for applications to discover which services are available, and the characteristics of the services. OBEX layer 670 enables the exchange of data objects. Additional information is provided by "Specification of the Bluetooth System, Core," version 1.0B, dated Dec. 1, 1999, herein incorporated by reference in its entirety.

FIG. 7A is a data flow diagram 700 illustrating a name discovery process (e.g., process 800 of FIG. 8) used by initiator device 720 to discover the user-friendly name 760 of a responding device 730 in accordance with one embodiment of the present invention. User-friendly name 760 can provide additional information to a user regarding responding device 730. For example, user-friendly name 760 can be used to identify a printer by manufacturer, features (color or monochrome), and location (e.g., a floor or room number); refer to FIG. 7B.

Figure 7B:
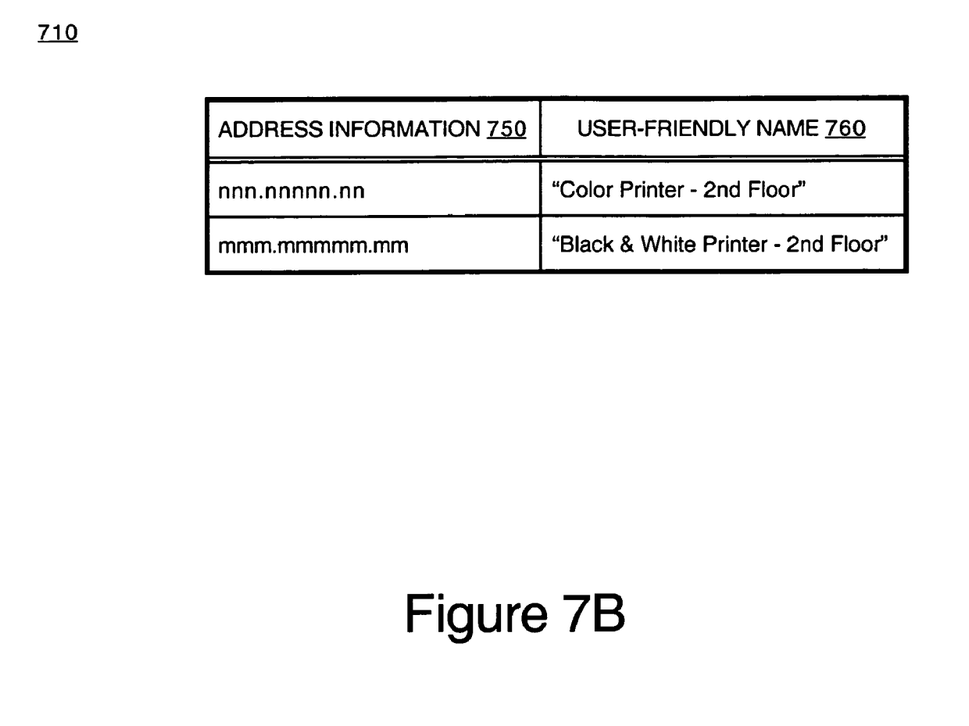
FIG. 7B illustrates an exemplary memory cache for storing names and addresses of devices in accordance with one embodiment of the present invention.

Continuing with reference to FIG. 7A, in accordance with the present invention, initiator device 720 includes a memory cache 710. With reference also to FIG. 4, memory cache 710 can be incorporated into ROM 430, RAM 410 or data storage device 490. In the present embodiment, memory cache 710 includes user-friendly names 760 and address information 750 for each of a plurality of devices, such as responding device 730. An exemplary embodiment of memory cache 710 is illustrated in FIG. 7B, discussed below.

With reference to FIG. 7A, in the Bluetooth embodiment, initiator device 720 and responding device 730 are Bluetooth-enabled devices. To simplify the discussion, the present invention is discussed for a single initiator device and responding device; however, it is understood that the present invention can be utilized with multiple initiator and responding devices.

In the present embodiment, initiator device 720 sends (broadcasts) an inquiry 740 which is received by responding device 730. Responding device 730 must be discoverable, meaning that it is scanning for inquiry messages. Responding device 730 sends inquiry response 742 to initiator device 720 in response to inquiry 740. Inquiry response 742 provides the Bluetooth device address information 750 (e.g., a numerical address or device access code) for responding device 730.

In accordance with the present invention, initiator device 720 uses address information 750 to look up the corresponding user-friendly name 760 in memory cache 710. User-friendly name 760 can be retrieved from memory cache 710 and displayed to a user on display device 440. The user can then choose whether or not to establish a persistent connection with responding device 730 based on the information provided by user-friendly name 760.

Thus, instead of sending a page and a name request, the present invention retrieves the user-friendly name 760 from memory. In accordance with the present invention, user-friendly name 760 can be discovered for responding device 730 without a name request and/or page, thereby also eliminating the need for a response to the name request and/or a response to a page. Consequently, the number of messages that need to be sent and received in order to complete the name discovery process is reduced, speeding up the process and conserving the power resources of initiator device 720 and responding device 760.

In addition, potential errors associated with pages and name requests can be reduced or eliminated. For example, because pages and name requests are not always needed for name discovery in accordance with the present invention, the number of initiator devices sending pages and/or name requests at any given time will be lower. Therefore, the number of instances in which a responding device will ignore one page and/or name request because it is responding to another will also be lowered, reducing the frequency at which pages and name requests will time out because they are being ignored. In addition, should the responding device move out of range of the initiator device in the time between the inquiry message and the page and/or name request, the initiator device can still complete the name discovery process by retrieving the user-friendly name from cache memory. Thus, the predictability and efficiency of the name discovery process are enhanced by the present invention.

Furthermore, the present invention can be implemented consistent with and within the framework of the Bluetooth specification. As such, Bluetooth-enabled devices implementing the present invention remain compatible with legacy Bluetooth-enabled currently being used. Moreover, the present invention can also be incorporated into legacy Bluetooth devices, for example, by specifying file space for memory cache 710 and by installing appropriate program instructions.

FIG. 7B illustrates one embodiment of a memory cache 710 for storing user-friendly names 760 and address information 750 for devices in accordance with the present invention. In this embodiment, address information 750 is used to index user-friendly names 760; that is, if address information 750 is known, the corresponding user-friendly name 760 can be determined and retrieved from memory cache 710. It is appreciated that other types of information uniquely identifying responding device 730 can be used to index user-friendly name 760 in memory cache 710.

The name and address information can be loaded into memory cache 710 is any of a variety of ways. For example, in one embodiment, user-friendly names 760 and address information 750 can be copied from another device to initiator device 720.

In another embodiment, user-friendly names 760 and address information 750 can be added to memory cache 710 by building on the name discovery process described by Section 6 of "Specification of the Bluetooth System, Core," version 1.0B, dated Dec. 1, 1999, herein incorporated by reference in its entirety. In this latter embodiment, initiator device 720 (FIG. 7A) initially broadcasts an inquiry message that is received by responding device 730 (FIG. 7A). Responding device 730 provides its device access code or numerical address (e.g., address information 750) in response to the inquiry. Initiator device 720 then transmits a page to responding device 730. Responding device 730 sends a page response to initiator device 720, and initiator device 720 sends a name request to responding device 730. Responding device 730 provides its user-friendly name 760 to initiator device 720 in response to the name request. In accordance with the present invention, initiator device 720 stores address information 750 and user-friendly name 760 in memory cache 710.

Subsequently, when initiator device 720 broadcasts an inquiry and receives an inquiry response from responding device 730, initiator device 720 can retrieve the user-friendly name 760 from memory cache 710 instead of sending a name request to responding device 730.

Figure 8:
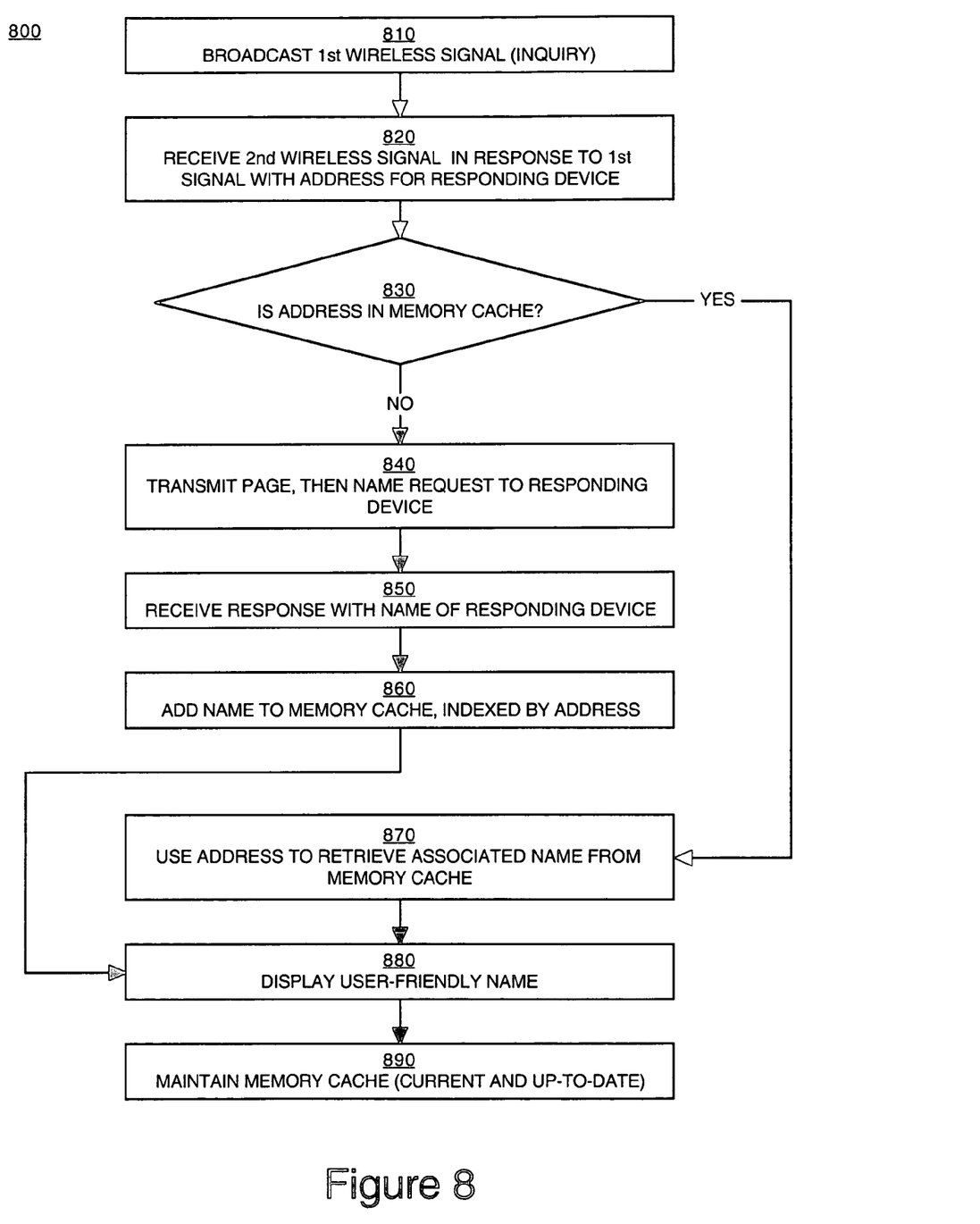
FIG. 8 is a flowchart of the steps in a process for discovering the name of a device in accordance with one embodiment of the present invention.

FIG. 8 is a flowchart of the steps in a process 800 for discovering the name of a device in accordance with one embodiment of the present invention. In the present embodiment, process 800 is implemented by an initiator device 720 (FIG. 7) such as portable computer system 400 (FIG. 4). Process 800 is implemented as computer-readable program instructions stored in a memory unit (e.g., ROM non-volatile 430 of FIG. 4) and executed by a processor (e.g., processor 450 or DSP 422 of FIG. 4). In the Bluetooth embodiment, initiator device 720 (e.g., portable computer system 400) is Bluetooth-enabled.

In step 810 of FIG. 8, with reference also to FIG. 7A, initiator device 720 (e.g., portable computer system 400 of FIG. 4) broadcasts a first wireless signal (inquiry 740) over the nominal range of a typical Bluetooth device. Inquiry 740 is received by responding device 730. In the Bluetooth embodiment, responding device 730 is Bluetooth-enabled.

In step 820 of FIG. 8, with reference also to FIG. 7A, initiator device 720 receives a second wireless signal (e.g., inquiry response 742) from responding device 730. Inquiry response 742 comprises address information 750 for responding device 730 (e.g., a device access code or numerical address). Inquiry response 742 can also include other information such as the class of device, the clock and the page scan mode for responding device 730.

With reference to FIG. 7A and to FIG. 8, in step 830 in the present embodiment, initiator device 720 determines whether memory cache 710 includes the address information 750 specific to responding device 730. If so, process 800 proceeds to step 870. Otherwise, process 800 proceeds to step 840.

Steps 840, 850 and 860 are used to obtain and store in memory cache 710 a user-friendly name from responding device 730 in accordance with one embodiment of the present invention. In other embodiments, other methods can be used to obtain the user-friendly name 760 for responding device 730 and store it in memory cache 710; for instance, the user-friendly name 760 can be copied to memory cache 710 from the memory of another device.

In step 840 of FIG. 8, in one embodiment, initiator device 720 transmits a third wireless signal (e.g., a page) to responding device 730. Responding device 730 sends a page response to initiator device 720, and initiator device 720 next sends a name request to responding device 730.

In step 850 of FIG. 8, in one embodiment, responding device 730 provides its user-friendly name 760 to initiator device 720 in response to the name request.

In step 860 of FIG. 8, with reference also to FIG. 7A, in accordance with the present invention, initiator device 720 stores user-friendly name 760 and address information 750 in memory cache 710. In the present embodiment, user-friendly names 760 are indexed by address information 750, although it is appreciated that other information uniquely identifying responding device 730 can be used to index user-friendly names 760 in memory cache 710.

In step 870 of FIG. 8, and with reference to FIG. 7A, in the present embodiment, initiator device 720 uses address information 750 to retrieve user-friendly name 760 from memory cache 710.

In step 880 of FIG. 8, with reference also to FIG. 7A, in the present embodiment, user-friendly name 760 is displayed to a user on a display device 440. The user can then decide, based on user-friendly name 760, whether to establish a persistent connection between initiator device 720 and responding device 730.

In step 890 of FIG. 8, with reference also to FIG. 7A, the information in memory cache 710 (e.g., address information 750 and user-friendly name 760) is maintained current and up-to-date. In the present embodiment, when a persistent connection is made between initiator device 720 and responding device 730, the user-friendly name 760 is supplied by responding device 730 to initiator device 720. That is, even though a name request was not sent by initiator device 720 in accordance with the present invention, responding device 730 automatically provides user-friendly name 760 to initiator device 720 when a persistent connection is made between the devices. The user-friendly name 760 provided in this manner can be used to update the memory cache 710, in case the name has changed since a previous connection between initiator device 720 and responding device 730. Thus, memory cache 710 will contain the most recent known user-friendly name 760 for each responding device 730.

In one embodiment, an aging scheme is applied when the number of entries (e.g., user-friendly names 760 and addresses 750) in memory cache 710 reaches a maximum amount. The maximum amount of entries can be user-specified, depending on the amount of memory available for memory cache 710. In one embodiment, the maximum amount is set at 50 entries. When the maximum number of entries in memory cache 710 is reached, a new entry in memory cache 710 will replace the entry that is, for example, the oldest or the least frequently accessed.

In the present embodiment, entries in memory cache 710 are sorted according to how long it has been since they were last accessed, regardless of whether a persistent connection was made to the device represented by that entry (that is, the user-friendly name 760 may have been retrieved from memory and displayed to a user, but a persistent connection was not made to responding device 730). Other types of schemes can be used to remove entries that are not frequently accessed or that are out of date.

In summary, the present invention provides a device and method that can speed up the Bluetooth name discovery process, and that can increase the efficiency and predictability of the name discovery process by reducing the problems that occur when pages and/or name requests collide or when devices move out of range of each other. The present invention also provides a device and method can reduce the burden on the limited power resources available to many types of Bluetooth devices. In addition, the present invention provides a device and method that can be implemented in Bluetooth-enabled devices, that is consistent with the Bluetooth specification, and that can be incorporated into legacy Bluetooth devices.

The preferred embodiment of the present invention, efficient discovery of devices in a Bluetooth environment, is thus described. While the present invention has been described in particular embodiments, it should be appreciated that the present invention should not be construed as limited by such embodiments, but rather construed according to the following claims.

What is claimed is:

1. In an initiator device having a memory for responding-device data and a wireless transceiver, a method for discovering a name of a responding device comprising:
   broadcasting a first wireless signal to be received by said responding device;
   receiving a second wireless signal from said responding device, said second wireless signal sent in response to said first wireless signal and comprising an address for said responding device;
   accessing said memory comprising names of devices using said second wireless signal;
   determining whether a name for said responding device is present in said memory;
   transmitting a wireless request for a name to said responding device provided a name for said responding device is absent from said memory;

receiving a name for said responding device in response to said wireless request; and storing said name received from said responding device in said memory, wherein said name is indexed in said memory using said address for said responding device and wherein said name is retrievable from said memory using said address.

2. The method as recited in claim 1 comprising:

updating said memory when said name for said responding device is changed.

3. The method as recited in claim 1 comprising:

displaying said name on a display of said initiator device.

4. The method as recited in claim 1 wherein said initiator device and said responding device are Bluetooth-enabled devices.

5. The method as recited in claim 1 wherein said initiator device is a portable computer system.

6. The method as recited in claim 1 comprising:

removing from said memory an entry for one of said devices when a total number of memory entries exceeds a predetermined limit, said entry comprising a name and an address.

7. The method as recited in claim 6 wherein an entry is removed from said memory according to an aging scheme, wherein said aging scheme ranks entries according to frequency of use.

8. In an initiator device having a memory and a wireless transceiver, a method for identifying a responding device by name comprising:

broadcasting a first wireless signal to be received by said responding device;

receiving a second wireless signal from said responding device, said second wireless signal sent in response to said first wireless signal and comprising an address for said responding device;

sending a wireless paging signal to said responding device;

receiving from said responding device a response to said wireless paging signal;

determining whether a name for said responding device is present in said memory of said initiator device;

transmitting a wireless request for a name to said responding device provided a name for said responding device is absent from said memory;

receiving a name for said responding device in response to said wireless request;

storing said name and said address received from said responding device in said memory, said name indexed by said address; and using said name address to retrieve said address name from said memory.

9. The method as recited in claim 8 comprising:

displaying said name on a display of said initiator device.

10. The method as recited in claim 8 comprising:

updating said memory when said name for said responding device is changed.

11. The method as recited in claim 8 wherein said initiator device and said responding device are Bluetooth-enabled devices.

12. The method as recited in claim 8 wherein said initiator device is a portable computer system.

13. The method as recited in claim 8 further comprising:

storing in said memory an entry for each of a plurality of other responding devices, said entry comprising a name and an address.

14. The method as recited in claim 13 further comprising:

removing from said memory an entry for one of said responding devices when a total number of memory entries exceeds a predetermined limit.

15. The method as recited in claim 13 wherein an entry is removed from said memory according to an aging scheme, wherein said aging scheme ranks entries according to frequency of use.

16. A wireless communication device comprising:

a bus;

a wireless transceiver unit coupled to said bus and for communicating with responding devices;

a memory coupled to said bus; and a processor coupled to said bus, said processor for performing a method for identifying a responding device by name, said method comprising:

broadcasting a first wireless signal to be received by said responding device;

receiving an address for said responding device in response to said first wireless signal;

determining whether a name for said responding device is present in said memory;

transmitting a first wireless request for a name to said responding device provided a name for said responding device is absent from said memory;

receiving said name for said responding device in response to said first wireless request;

storing said address and said name received from said responding device in said memory, said name indexed by said address; and retrieving said name from said memory to subsequently identify said responding device in lieu of performing a second wireless request after said first wireless request, wherein said name is retrieved from said memory using said address.

17. The wireless communication device of claim 16 wherein said retrieving step comprises:

broadcasting a second wireless signal to be received by said responding device;

receiving said address from said responding device in response to said second wireless signal; and retrieving from said memory said name corresponding to said address.

18. The wireless communication device of claim 16 comprising:

a display device for displaying said name obtained from said memory.

19. The wireless communication device of claim 16 wherein said method comprises:

updating said memory when said name for said responding device is changed.

20. The wireless communication device of claim 16 wherein said wireless communication device and said responding device are Bluetooth-enabled devices.

21. The wireless communication device of claim 16 wherein said wireless communication device is a portable computer system.

22. The wireless communication device of claim 16 wherein said storing step comprises:

storing in said memory an entry for each of a plurality of responding devices, said entry comprising a name and an address.

23. The wireless communication device of claim 22 wherein said storing step further comprises:

removing from said memory an entry for one of said plurality of responding devices when a total number of memory entries exceeds a predetermined limit.

24. The wireless communication device of claim 22 wherein an entry is removed from said memory according to an aging scheme, wherein said aging scheme ranks entries according to frequency of use.

* * * * *